United States Patent [19]
Shirahata et al.

[11] 3,898,952
[45] Aug. 12, 1975

[54] APPARATUS FOR PRODUCTION OF MAGNETIC RECORDING MEDIUM

[75] Inventors: Ryuji Shirahata; Tatsuji Kitamoto; Mahito Shimizu; Masaaki Suzuki, all of Kanagawa, Japan

[73] Assignee: Fuji Photo Film Co., Ltd., Kanagawa, Japan

[22] Filed: July 25, 1974

[21] Appl. No.: 491,900

[30] Foreign Application Priority Data

July 25, 1973 Japan ................................ 48-83837

[52] U.S. Cl. .................. 118/49.1; 427/40; 427/128
[51] Int. Cl. ............................................ C23c 13/12
[58] Field of Search .......................... 118/49.1, 49.5; 117/93.1 GD, 93.2, 107.1, 93.1 CD

[56] References Cited

UNITED STATES PATENTS 3,477,902 11/1969 Tomasino et al. ...... 117/93.1 GD X

*Primary Examiner*—Morris Kaplan
*Attorney, Agent, or Firm*—Sughrue, Rothwell, Mion, Zinn & Macpeak

[57] ABSTRACT

An apparatus for the continuous production of a magnetic recording tape comprising a vacuum chamber containing means including an anode and a cathode for generating a plasma of the glow discharge of a gas therebetween, a rotable cylindrical permanent magnet as the cathode of the plasma generating means, a tape substrate supply roll and a tape substrate take up roll for passing a tape substrate in contact with the rotable cylindrical permanent magnet as the cathode of the plasma generating means and positioned such that the tape contacts the cylindrical permanent magnetic whereby the rotable magnet rotates as the tape is passed by the supply roll and the take up roll and such that the tape passes through a plasma zone concentrated by the cylindrical permanent magnet, and means for evaporating a ferromagnetic substance as the anode of the plasma generating means.

7 Claims, 1 Drawing Figure

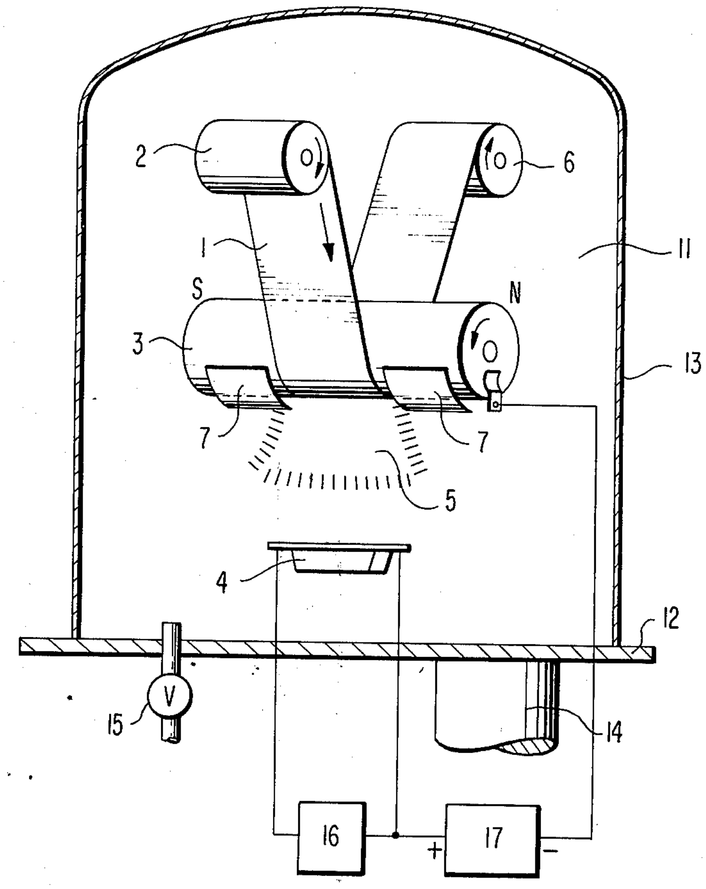
2
6
1
11
S
N
3
13
7
7
5
4
12
15
V
14
16
17
+
-

APPARATUS FOR PRODUCTION OF MAGNETIC RECORDING MEDIUM

BACKGROUND OF THE INVENTION

1. Field of the Invention

This invention relates to an apparatus for the production of a magnetic recording medium by ionic-plating, and more precisely to an apparatus for the continuous manufacture of a magnetic recording tape in which a magnetic thin film having excellent magnetic characteristics particularly a high squareness ratio is uniformly formed on the tape substrate.

2. Description of the Prior Art

Ferromagnetic thin metal films formed by electroplating, non-electrolytic plating, sputtering, vacuum evaporation plating, ionic-plating or the like have recently become worthy of notice as the so-called non-binder type magnetic recording media in which no binder is used, in place of conventional binder-type magnetic recording media produced by coating a dispersion of magnetic powders of $\gamma$-$Fe_2O_3$, Co-doped $\gamma$-$Fe_2O_3$, $Fe_3O_4$, $CrO_2$ or ferromagnetic alloys in an organic binder on a substrate. As one of the essential requisites for magnetic recording media used for high density recording, it has been proposed to impart a high coercive force thereto and to reduce the thickness of the magnetic film. In order to achieve thin magnetic films, improvements have been proposed in non-binder type magnetic recording media which can more easily be reduced in thickness by a factor of 10 over other coated-typed magnetic recording media, and various efforts have heretofore been made for the practical use of such advantageous non-binder type magnetic recording media.

A method of evaporation plating in a glow discharge or a so-called ionic-plating method is disclosed in U.S. Pat. No. 3,329,601. This method has the possibility that a magnetic thin film having sufficient coercive force and squareness ratio suitable for magnetic recording medium can be formed, and so, this method is an interesting method. In addition, according to this method, evaporated metal is ionized in the glow discharge field and accelerated by an electric field for adherence to a substrate, and thus, adhesion of the evaporated metal particles on the substrate is far stronger than the adhesion obtained using other conventional vacuum evaporation plating methods. Accordingly, the magnetic recording medium produced by this method is suitable for use as a magnetic recording medium which is subjected to severe conditions under relative movement with a magnetic head. However, according to the conventional ionic-plating method as described in this U.S. Pat. No. 3,329,601, although improvement of the coercive force can be achieved due to the pressure of argon gas during the glow discharge, it is difficult or rather impossible to obtain the high squareness ratio of the B-H curve necessary for a magnetic recording medium.

SUMMARY OF THE INVENTION

An object of this invention is to provide an apparatus for producing a magnetic recording tape having excellent magnetic characteristics especially a markedly higher squareness ratio as well as good surface characteristics, by ionic-plating.

More precisely, this invention provides an apparatus for the continuous manufacture of magnetic recording tape by ionic-plating in which the tape substrate is specifically contacted with the surface of a cylindrical permanent magnet so as to be able to be passed through the concentrated part of a plasma gnerated due to the force of the magnetic field of the magnet.

The invention provides an apparatus for the continuous production of a magnetic recording tape comprising a vacuum chamber containing means including an anode and a cathode for generating a plasma of the glow discharge of a gas therebetween, a rotatable cylindrical permanent magnet as the cathode of the plasma generating means, a tape substrate supply roll and a tape substrate take up roll for passing a tape substrate in contact with the rotatable cylindrical permanent magnet as the cathode of the plasma generating means and positioned such that the tape contacts the cylindrical permanent magnet whereby the rotatable magnet rotates as the tape is passed by the supply roll and the take up roll and such that the tape passes through a plasma zone concentrated by the cylindrical permanent magnet, and means for evaporating a ferromagnetic substance as the anode of the plasma generating means.

BRIEF DESCRIPTION OF THE DRAWING

The FIGURE shows one embodiment of the apparatus of the invention.

DETAILED DESCRIPTION OF THE INVENTION

In the formation of magnetic thin films for use in memory elements for electronic computers and the like practiced vacuum evaporation plating, a method has heretofore been practed where a magnetic field is applied during the formation thereof to induce a uniaxial magnetic anisotropy in the magnetic thin film. The apparatus of this invention is based upon the fact, which is different from the fact which has heretofore been known, that when the substrate is positioned in the concentrated part of a plasma generated due to the application of a magnetic field in the course of ionic-plating procedure, uniaxial anisotropy induction does not occur in the formed magnetic thin film and the magnetic thin film obtained has a markedly higher squareness ratio in every direction in the surface thereof as well as good surface characteristics.

Representative examples of ferromagnetic substances which can be used in the apparatus of the present invention as ferromagnetic material evaporated by the evaporation means as the anode are, for example, ferromagnetic metals such as iron, cobalt and nickel, magnetic alloys such as Fe-Co, Fe-Ni, Fe-Rh, Fe-Cu, Fe-Au, Co-Cu, Co-Au, Co-Y, Co-La, Co-Pr, Co-Gd, Co-Sm, Co-Pt, Ni-Cu, Fe-Co-Ni, Mn-Bi, Mn-Sb and Mn-Al, and ferrite-type magnetic substances such as Ba-ferrite and Sr-ferrite.

The thickness of the magnetic thin film formed in the apparatus of this invention is, in general, in the range of about 0.05 $\mu$m to 1.0 $\mu$m, preferably 0.1 $\mu$m to 0.4 $\mu$m, in view of the essential requisites that the film be sufficiently thick that a sufficient output can be imparted to the magnetic recording medium and that the film be sufficiently thin that high density recording can be carried out. The strength of the magnetic field to be applied in the apparatus of this invention is in the range of about 50 to 5,000 oersteds, more preferably 100 to 2,000 oersteds, on the surface of the substrate.

Suitable ionic-plating conditions which can be used in the apparatus of this invention are those as described in the above mentioned U.S. Pat. No. 3,329,601, and the degree of vacuum in the apparatus containing a rare gas employed in ionic-plating is, in general, in the range of about 0.001 to 0.1 Torr, preferably 0.005 to 0.05 Torr, and the voltage potential for glow discharge is, in general, about 0.1 to 5 Kv, preferably 0.2 to 2.0 Kv. The time necessary for ionic-plating varies, depending upon the process conditions and the thickness of the magnetic thin film desired, and is, in general, about 0.5 to 20 minutes. The temperature generally used for evaporating the ferromagnetic material ranges from about 1,000°C to 1,700°C.

The present invention is explained in greater detail with reference to the drawing attached hereto.

The FIGURE is an skeletal outline drawing showing one embodiment of the apparatus of the present invention for the production of a magnetic recording tape.

Referring to the FIGURE, a vacuum chamber 11 is enclosed by a base plate 12 and a vacuum enclosure 13 such as a belljar, and evacuated to a vacuum through a opening 14. 15 is a needle pipe to introduce a rare gas such as argon, helium or the like into the vacuum chamber 11. In the vacuum chamber 11 are installed a tape substrate 1, supply roll 2 and take-up roll 6 therefor and a cylindrical permanent magnet 3. N and S designate the N-pole and S-pole of the magnet, respectively, and the permanent magnet 3 is capable of rotating in contact with the tape substrate 1. An evaporative source of a ferromagnetic substance 4 is placed below the permanent magnet 3, and is connected with an electric power source for heater 16. 7 is a cover to prevent evaporation and plating of the ferromagnetic substance on the permanent magnet 3. The permanent magnet 3 and the evaporative source 4 are connected with a high voltage direct current power source 17 so that the permanent magnet is the negative pole and the evaporative source is the positive pole. After the interior of the vacuum chamber 11 is completely evacuated, a rare gas is introduced through the needle pipe 15, and the high voltage direct current power source is switched on to cause a glow discharge. The plasma generated by the discharge is concentrated in the central region 5 of the magnet due to the magnetic field thereof.

Afterwards, the power source for heater 16 is switched on to evaporate the ferromagnetic substance for ionic-plating. After being forwarded by the supply roll 2, the tape substrate 1 is, while passing along the permanent magnet 3, subjected to ionic-plating in a concentrated area 5 of plasma and then is taken up by the take-up roll 6.

The cylindrical permanent magnet 3 also serves as a heat sink to prevent the elevation of temperature of the tape substrate 1 during the ionic-plating procedure.

The following example illustrates the invention in greater detail.

EXAMPLE

Using the above described apparatus, Co, Co-Ni, Co-Ni-Cr were continuously plated on a polyethylene terephthalate base (width; 2 inches, thickness: 25 μm) by ionic-plating, to produce a magnetic recording tape. In this ionic-plating, the strength of the magnetic field on the base was 1,000 oersted, helium was used as the rare gas, the degree of vacuum was 0.01 Torr and the direct current voltage was 0.8 Kv. The surface characteristics of the thus obtained magnetic tape were good, and the base was neither deformed nor shrunk due to heat.

For comparison, a non-magnetic metal cylinder was used in place of the cylindrical permanent magnet 3, the former having the same shape as the latter, and ionic-plating was carried out under the same conditions as above. In this comparative case, however, a concentration of plasma does not occur.

The magnetic characteristics of the magnetic recording tapes produced in this Example were measured and the results obtained are given in the following Table.

Table

| Composition of Evaporative Source | With Non-magnetic Metal cylinder | | | With Cylindrical Permanent Magnet | | |
|---|---|---|---|---|---|---|
| | Film Thickness | Coercive Force | Squareness Ratio | Film Thickness | Coercive Force | Squareness Ratio |
| (wt%) | (μm) | (oe) | | (μm) | (oe) | |
| Co | 0.28 | 290 | 0.51 | 0.26 | 300 | 0.78 |
| Co(80)-Ni(20) | 0.34 | 290 | 0.57 | 0.36 | 280 | 0.75 |
| Co(75)-Ni(20)-Cr(5) | 0.22 | 320 | 0.55 | 0.25 | 320 | 0.84 |

The magnetic recording tapes produced by ionic-plating in the concentrated region of the plasma concentrated by magnetic field have uniform magnetic characteristics in any of the horizontal and longitudinal directions of the tape. After these magnetic recording tapes are set in a video tape recorder to measure the video output thereof, it was noted that the magnetic recording tapes produced in the concentrated plasma displayed higher output with every composition.

According to the apparatus of the present invention, magnetic tapes of a higher squareness ratio which are suitable for high density recording can be continuously produced by ionic-plating. In the above explanation, the attached drawing was referred to. However, the present invention is in no way limited to only this embodiment shown in the drawing.

With the apparatus of this invention, it is possible to produce an even magnetic thin film having good adhesion to the substrate thereof by ionic-plating, and further, it is possible to continuously produce a magnetic recording tape having an markedly higher B-H curve squareness ratio. In high density recording with magnetic recording media, self-demagnetization loss increases as the wavelength for recording wavelength decreases, and therefore, a higher squareness ratio is required for the magnetic recording medium. With the apparatus of the present invention, it is easy to produce improved magnetic recording media with this preferable magnetic characteristic. In addition, it is possible, with the apparatus of the present invention, to obtain magnetic thin films having better surface characteristics and improved metallic brilliance than those of magnetic films produced with a conventional ionic-plating apparatus. The apparatus of this invention has still another advantage in that heat deformation does not occur in the tape substrate due to the cooling effect of the cylindrical permanent magnet which is in contact with the tape substrate during the ionic-plating, and thus the formed magnetic recording tape is good as a whole.

While the invention has been described in detail and with reference to specific embodiments thereof, it will be apparent to one skilled in the art that various changes and modifications can be made therein without departing from the spirit and scope thereof.

What is claimed is:

1. An apparatus for the continuous production of a magnetic recording tape comprising a vacuum chamber containing means including an anode and a cathode for generating a plasma of the glow discharge of a gas therebetween, a rotatable cylindrical permanent magnet as the cathode of the plasma generating means, a tape substrate supply roll and a tape substrate take up roll for passing a tape substrate in contact with the rotatable cylindrical permanent magnet as the cathode of the plasma generating means and positioned such that the tape contacts the cylindrical permanent magnet whereby the rotable magnet rotates as the tape is passed by the supply roll and the take up roll and such that the tape passes through a plasma zone concentrated by the cylindrical permanent magnet, and means for evaporating a ferromagnetic substance as the anode of the plasma generating means.

2. The apparatus as claimed in claim 1, wherein said gas is argon or helium.

3. The apparatus as claimed in claim 1, wherein the strength of the magnetic field is about 50 to 5,000 oersteds.

4. The apparatus as claimed in claim 1, wherein the voltage of glow discharge is about 0.1 to 5.0 Kv.

5. The apparatus as claimed in claim 1, wherein the degree of vacuum in the vacuum chamber is about 0.001 to 0.1 Torr.

6. The apparatus as claimed in claim 1, wherein the thickness of the formed ferromagnetic thin film is about 0.05 to 1.0 $\mu$m.

7. The apparatus as claimed in claim 1, wherein said ferromagnetic substance is selected from the group consisting of Fe, Co, Ni, Fe-Co, Fe-Ni, Co-Ni, Fe-Rh, Fe-Cu, Fe-Au, Co-Cu, Co-Au, Co-Y, Co-La, Co-Pr, Co-Gd, Co-Sm, Co-Pt, Ni-Cu, Fe-Co-Ni, Mn-Bi, Mn-Sb, Mn-Al, Ba-ferrite and Sr-ferrite.

* * * * *